(12) United States Patent
Adolfs

(10) Patent No.: US 8,958,150 B2
(45) Date of Patent: Feb. 17, 2015

(54) TELESCOPE ASSEMBLY FOR TRACKING CELESTIAL BODIES

(75) Inventor: Theodorus Stephanus Maria Adolfs, AM Angeren (NL)

(73) Assignees: Theodorus Maria Eeuwes, Angeren (NL); Theodorus Stephanus Maria Adolfs, Angeren (NL)

( * ) Notice: Subject to any disclaimer, the term of this patent is extended or adjusted under 35 U.S.C. 154(b) by 283 days.

(21) Appl. No.: 13/580,089

(22) PCT Filed: Feb. 22, 2011

(86) PCT No.: PCT/NL2011/050126
§ 371 (c)(1),
(2), (4) Date: Nov. 6, 2012

(87) PCT Pub. No.: WO2011/102729
PCT Pub. Date: Aug. 25, 2011

(65) Prior Publication Data
US 2013/0128347 A1 May 23, 2013

(30) Foreign Application Priority Data
Feb. 22, 2010 (NL) .................................. 2004280

(51) Int. Cl.
*G02B 23/16* (2006.01)

(52) U.S. Cl.
CPC ..................................... *G02B 23/16* (2013.01)
USPC ........................................ 359/401; 359/430

(58) Field of Classification Search
USPC ......................................... 359/401, 429, 430
See application file for complete search history.

(56) References Cited

U.S. PATENT DOCUMENTS

| 219,469 | A | | 8/1879 | Hayford | |
|---|---|---|---|---|---|
| 3,464,116 | A | | 9/1969 | Kissell | |
| 4,764,881 | A | * | 8/1988 | Gagnon | 700/302 |
| 4,904,071 | A | | 2/1990 | Harbour | |
| 6,519,084 | B1 | * | 2/2003 | Kawasaki | 359/430 |
| 6,940,642 | B2 | * | 9/2005 | Shen | 359/430 |
| 6,972,902 | B1 | * | 12/2005 | Chen et al. | 359/429 |
| 8,514,489 | B2 | * | 8/2013 | Lopresti | 359/430 |
| 8,699,134 | B2 | * | 4/2014 | Shen | 359/429 |
| 2004/0085632 | A1 | | 5/2004 | Shen | |
| 2010/0085638 | A1 | * | 4/2010 | Lopresti | 359/430 |
| 2010/0182684 | A1 | * | 7/2010 | Burr | 359/429 |

FOREIGN PATENT DOCUMENTS

| EP | 1852727 | 11/2007 |
|---|---|---|
| GB | 1081737 | 8/1967 |
| GB | 1188578 | 8/1970 |

* cited by examiner

*Primary Examiner* — Frank Font
(74) *Attorney, Agent, or Firm* — Ladas & Parry LLP

(57) ABSTRACT

Telescope assembly for tracking celestial bodies, comprising a telescope and a positioning device for the telescope, wherein the positioning device is provided with an under frame to be placed on a base, a first telescope holder placed on the under frame, a second telescope holder which at a first side is coupled to the first telescope holder and which bears the telescope, wherein the telescope assembly is provided with a third telescope holder which is coupled to a second side of the second telescope holder and which by means of a third rotary bearing can be rotated about a polar axis of rotation.

20 Claims, 10 Drawing Sheets

TELESCOPE ASSEMBLY FOR TRACKING CELESTIAL BODIES

BACKGROUND OF THE INVENTION

Figure 1:
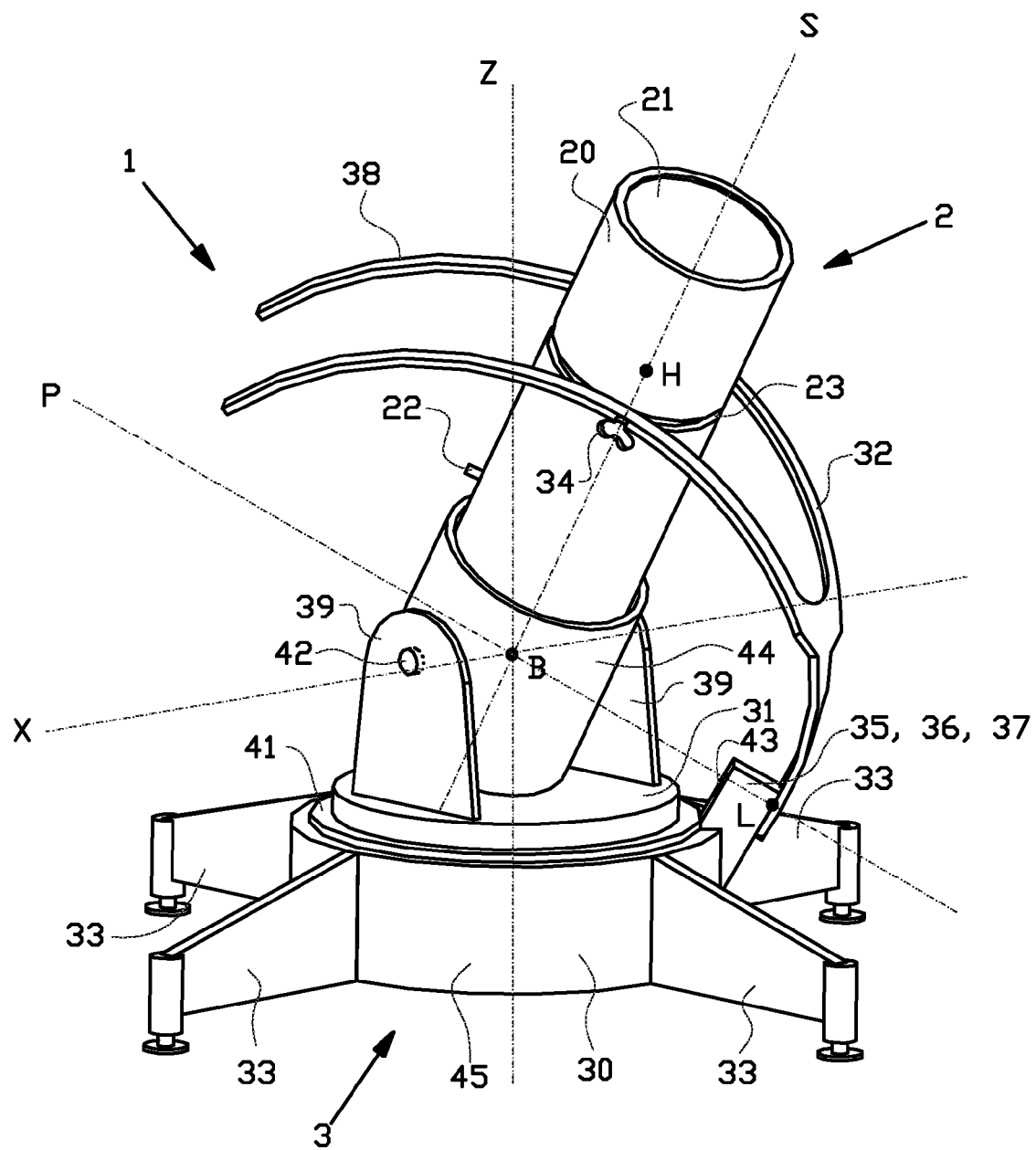

The invention relates to a telescope assembly for observing celestial bodies.

A known telescope assembly for observing celestial bodies comprises a telescope and a positioning device for the telescope, wherein the positioning device is provided with an under frame placed on a horizontal base and a first telescope holder placed on the under frame and holding the telescope, wherein the telescope holder is able to rotate with respect to the under frame about a notional vertical axis, wherein the telescope is able to rotate with respect to the telescope holder about a notional horizontal axis. As a result of the rotation of planet earth the celestial bodies observed rotate with respect to the field of view. This is also called field rotation. Field rotation, particularly in case of photography with a slow shutter speed, is not desirable, as it may lead to a blurred photo. Within the said rotational freedoms the telescope is unable to compensate the field rotation to a sufficient extent.

It is an object of the invention to counteract field rotation within the field of view of the telescope.

SUMMARY OF THE INVENTION

According to a first aspect the invention provides a telescope assembly for tracking celestial bodies, comprising a telescope and a positioning device for the telescope, wherein the positioning device is provided with an under frame to be placed on a base, a first telescope holder placed on the under frame, which telescope holder in the placed condition of the under frame can be rotated about a vertical axis of rotation by means of a first rotary bearing, a second telescope holder which at a first side is coupled to the first telescope holder and which bears the telescope, wherein by means of a second rotary bearing the second telescope holder can be rotated with respect to the first telescope holder about a horizontal axis of rotation, wherein the vertical axis of rotation is perpendicular to the horizontal axis of rotation and intersects the horizontal axis of rotation in an intersection, wherein the telescope assembly is provided with a third telescope holder which, preferably at a distance from the intersection, is coupled to a second side of the second telescope holder, wherein the third telescope holder at a distance from of the coupling between the second telescope holder and the third telescope holder is coupled to the under frame so as to be rotatable about a polar axis of rotation by means of a third rotary bearing, wherein the polar axis of rotation extends through the intersection of the horizontal and the vertical axis of rotation, wherein between the coupling with the second telescope holder and the third rotary bearing, the third telescope holder extends free of the first telescope holder.

The third telescope holder provides an effective rotation of the second telescope holder or the telescope about the polar axis of rotation, which from rotations about the vertical and the horizontal axes of rotation is difficult to control in a linear manner. The second and third telescope holder are borne by the same under frame, as a result of which a reliable transfer of the movement of the third telescope holder to the second telescope holder can be achieved.

In one embodiment the third telescope holder is forked and at the location of the fork is coupled on both sides of the second telescope holder. The fork engages the second telescope holder or the telescope on both sides, at a distance from the optical axis of the telescope and as a result is able to effect a stable coupling.

In one embodiment the telescope assembly is provided with a fourth rotary bearing that rotatably couples the second telescope holder to the first telescope holder, wherein the fourth rotary bearing provides a rotation of the second telescope holder or the telescope about its own center line or optical axis. Due to the rotation about the optical axis the rotation of the celestial bodies to be followed with respect to the field of view observed through the telescope, also called field rotation, can be counteracted.

In one embodiment the fourth rotary bearing is formed within a cylindrical sleeve in which the second telescope holder is concentrically accommodated. The accommodation of the second telescope holder or the telescope in the sleeve may effect a transfer of the movement from the first telescope holder to the second telescope holder or telescope.

In one embodiment at the location of the fork the third telescope holder is rotation-fixedly connected to the second telescope holder. The movement of the third telescope holder can therefore be directly passed on to the second telescope holder or the telescope. Setting the second telescope holder or the telescope once suffices during a tracking.

In one embodiment the first telescope holder is provided with two vertically upright supports in between which the second rotary bearing is arranged, wherein the second rotary bearing preferably comprises two hinges at the supports, which hinges are arranged on both sides of the first telescope holder and which are situated on the horizontal axis of rotation. By means of the hinges the second telescope holder or the telescope can be tilted about the horizontal axis of rotation at an angle of inclination to the base.

In one embodiment the telescope assembly is provided with a drive for rotation of the first telescope holder with respect to the under frame about the vertical axis. As a result the second telescope holder or the telescope can be rotated about the vertical axis.

In one embodiment the telescope assembly is provided with a control unit, which measures the rotation speed of the third telescope holder about the polar axis of rotation and compares it with a fixed or linear angular speed, wherein the control unit is adapted for adjusting the drive on the basis of the comparison in order to have the rotation of the third telescope holder about the polar axis take place in a linear manner. Because of said measurement and control feed-back, the drive can be variably controlled in order to effect a linear rotation of the third telescope holder about the polar axis.

In one embodiment a full rotation of the third telescope holder about the polar axis takes one day. A day may be set as a solar day or synodic day of 24 hours, or a sidereal day of 23 hours, 56 minutes and 4.09 seconds. As a result the rotation speed of the third telescope holder about the polar axis is substantially synchronous with the rotation speed of the earth, the sun or the celestial bodies, respectively.

In one embodiment the telescope is accommodated in or forms a part of the second telescope holder. In that way the movement of the third telescope holder is directly passed on to the telescope, which as a result rotates about the polar axis.

In one embodiment the telescope protrudes from the second telescope holder and the telescope is hinged to the second telescope holder. In that way the so-called dead center or the dynamically undefined center is counteracted, which occurs when the telescope is directed vertically upwards. By coupling the telescope to the second telescope holder at a distance from the intersection, a dynamically defined rotary interaction is created as a result of which the telescope is able to move through the dead center.

In one embodiment the telescope extends through the third telescope holder at a distance from the second telescope holder. In that way the telescope can be guided by the third telescope holder in order to achieve a stable positioning.

In one embodiment the telescope is coupled to the third telescope holder at a distance from the second telescope holder. In that way the telescope can be secured to the third telescope holder in order to achieve a stable positioning.

In one embodiment the third rotary bearing is detachably or movably connected to the under frame in order to be able to set the polar axis of rotation.

In one embodiment the under frame is provided with a curved slide or a protractor, wherein the third rotary bearing can be secured at a position along the slide or protractor. The slide or protractor has a curvature of which the center coincides with the intersection. As a result the polar axis of rotation in case of movement of the third rotary bearing along the slide or the protractor continues to go through the intersection.

In one embodiment the under frame has a cavity, wherein the first rotary bearing extends around a passage to the cavity in the under frame, wherein the third rotary bearing is in the cavity and the third telescope holder extends from the third rotary bearing out of the cavity through the passage towards the second telescope holder. The third rotary bearing and the third telescope holder are at least partially situated in the cavity of the under frame, as a result of which a compact telescope assembly can be achieved.

According to a second aspect the invention provides a method for tracking celestial bodies with a telescope assembly, comprising a telescope and a positioning device that bears the telescope, wherein the positioning device is provided with an under frame to be placed on a base, a first telescope holder placed on the under frame, which telescope holder in the placed condition of the under frame can be rotated about a vertical axis of rotation by means of a first rotary bearing, a second telescope holder which at a first side is coupled to the first telescope holder and which bears the telescope, wherein by means of a second rotary bearing the second telescope holder can be rotated with respect to the first telescope holder about a horizontal axis of rotation, wherein the vertical axis of rotation is perpendicular to the horizontal axis of rotation and intersects the horizontal axis of rotation in an intersection, wherein the telescope assembly is provided with a third telescope holder which, preferably at a distance from the intersection, is coupled to a second side of the second telescope holder, wherein the third telescope holder at a distance from the coupling between the second telescope holder and the third telescope holder is coupled to the under frame so as to be rotatable about a polar axis of rotation by means of a third rotary bearing, wherein the polar axis of rotation extends through the intersection of the horizontal and the vertical axis of rotation, wherein between the coupling with the second telescope holder and the third rotary bearing, the third telescope holder extends free of the first telescope holder, wherein the telescope assembly is provided with a drive for rotation of the first telescope holder about the vertical axis, wherein the method comprises the following steps: by means of the drive rotating the first telescope holder about the vertical axis, as a result of the rotation of the first telescope holder bringing the second telescope holder into motion, as a result of the motion of the second telescope holder having the third telescope holder rotate about the polar axis, measuring the rotation speed of the third telescope holder about the polar axis, comparing the rotation speed of the third telescope holder about the polar axis with a constant or fixed angular speed, on the basis of the comparison adjusting the drive so that the rotation speed of the third telescope holder about the parallactic polar axis takes place in a linear manner, as a result of the rotation of the third telescope holder having the second telescope holder rotate about its center line.

In that way the rotation of the celestial bodies to be followed with respect to the field of view observed through the telescope, also called field rotation, can be counteracted.

According to one embodiment the telescope is accommodated in or forms a part of the second telescope holder.

According to one embodiment the telescope protrudes from the second telescope holder and the telescope is hinged to the second telescope holder.

According to a third aspect of the invention, the invention provides a third telescope holder, apparently suitable and intended for the telescope assembly according to the invention.

The aspects and measures described in this description and the claims of the application and/or shown in the drawings of this application may where possible also be used individually. Said individual aspects and other aspects may be the subject of divisional patent applications relating thereto. This particularly applies to the measures and aspects that are described per se in the sub claims.

SHORT DESCRIPTION OF THE DRAWINGS

Figure 2:
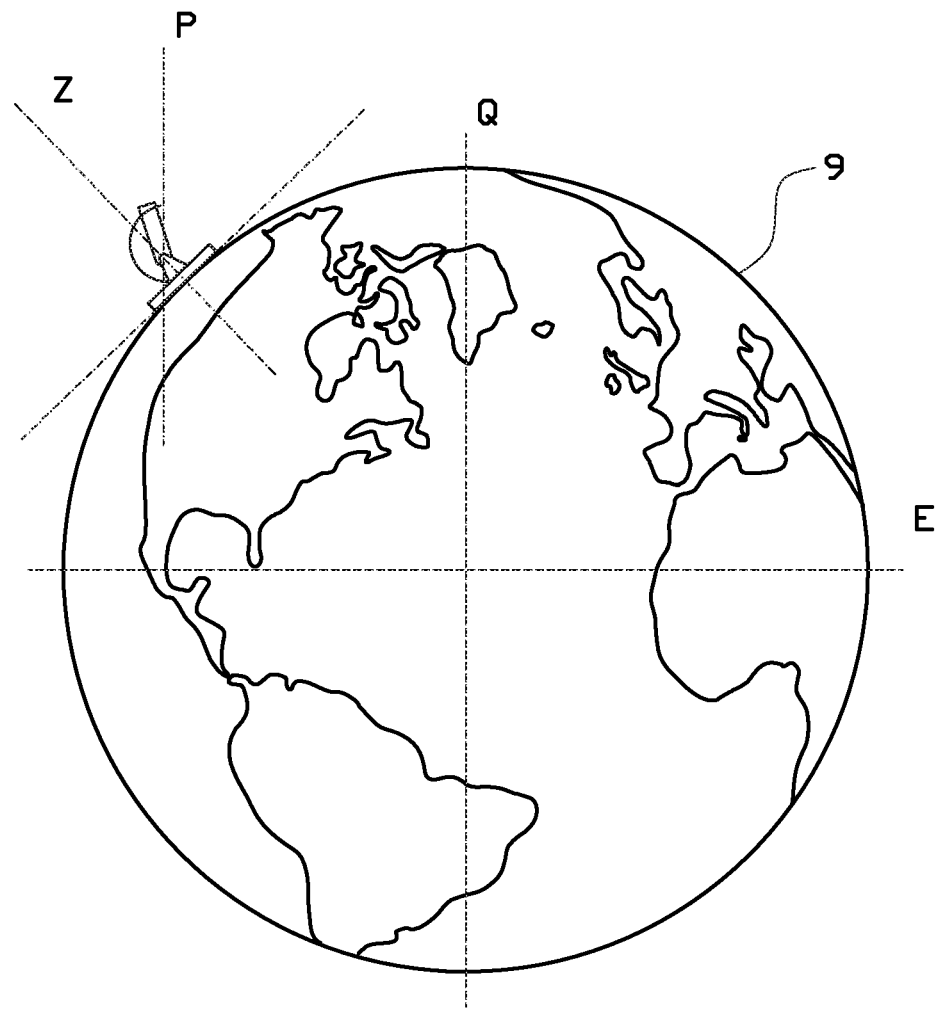
Figure 3A:
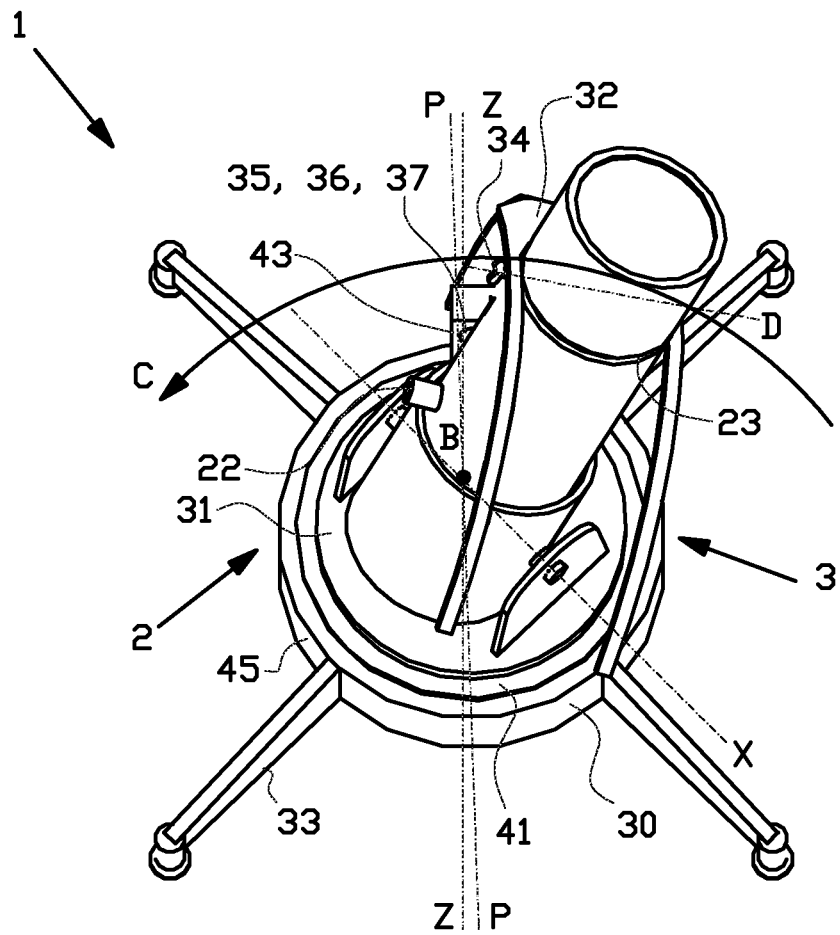
Figure 3B:
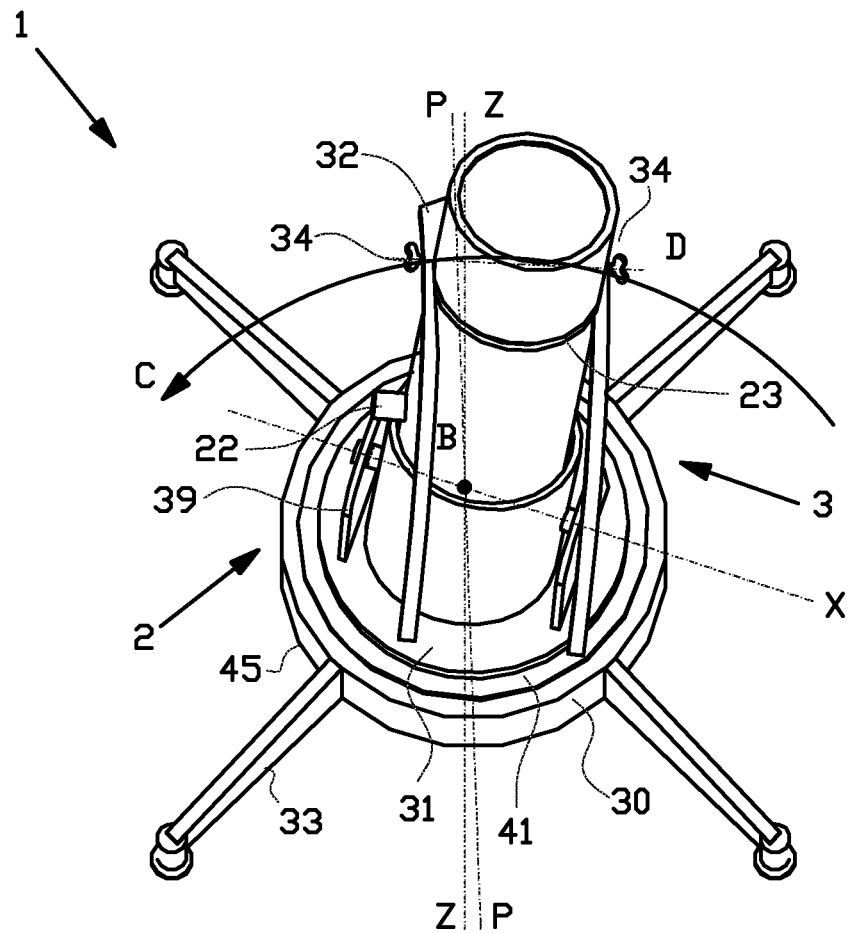
Figure 3C:
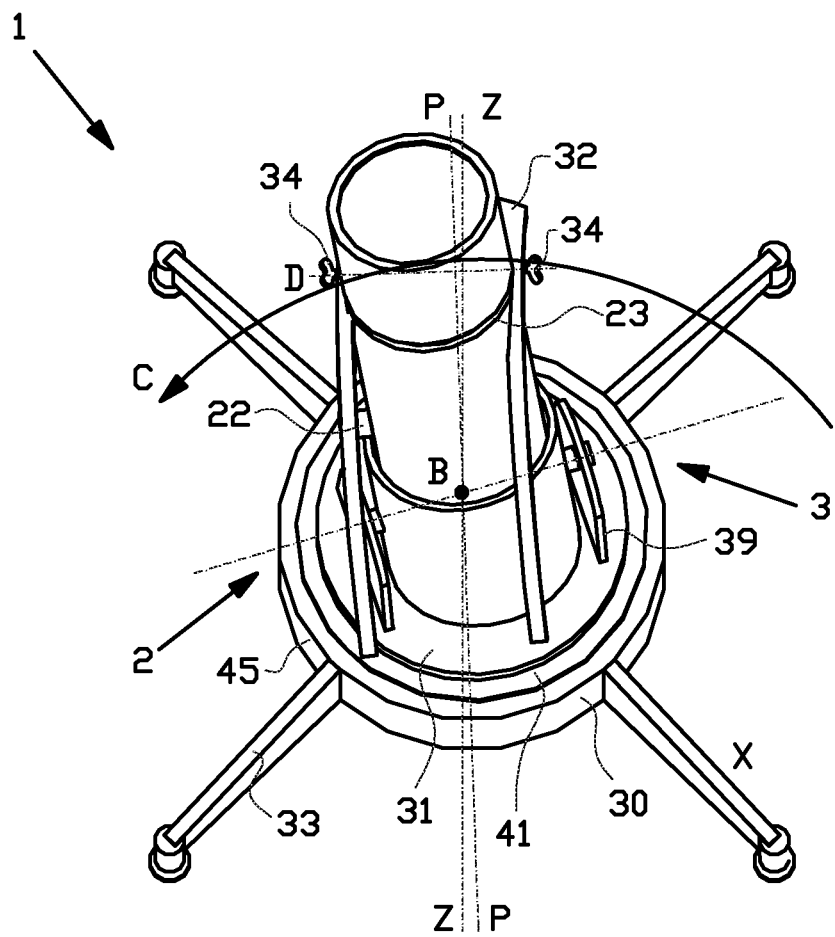
Figure 3D:
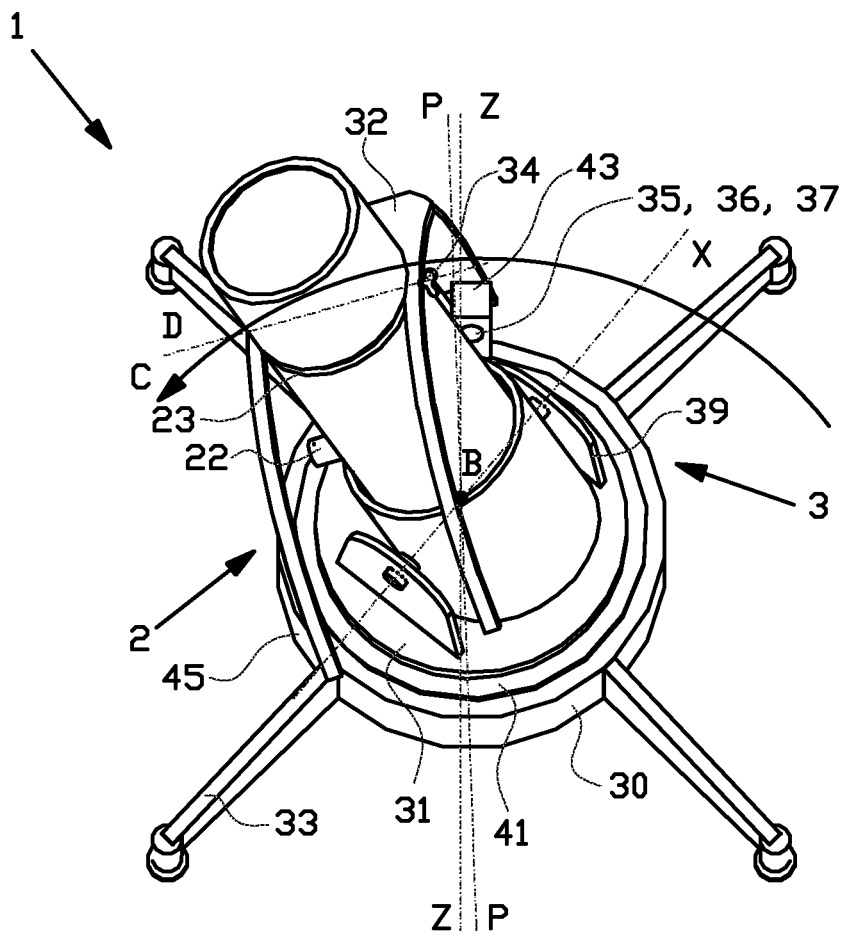
Figure 4:
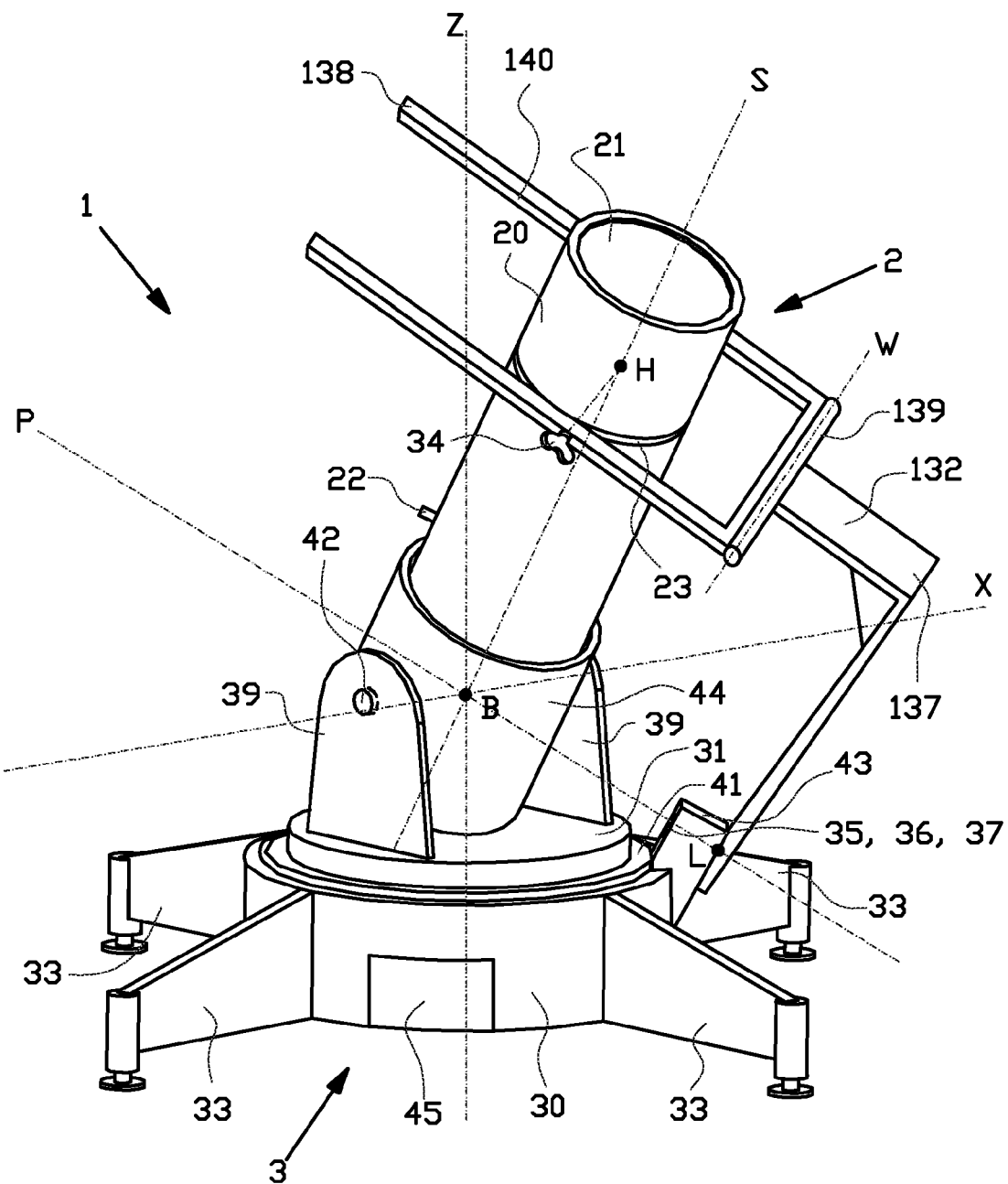
Figure 5:
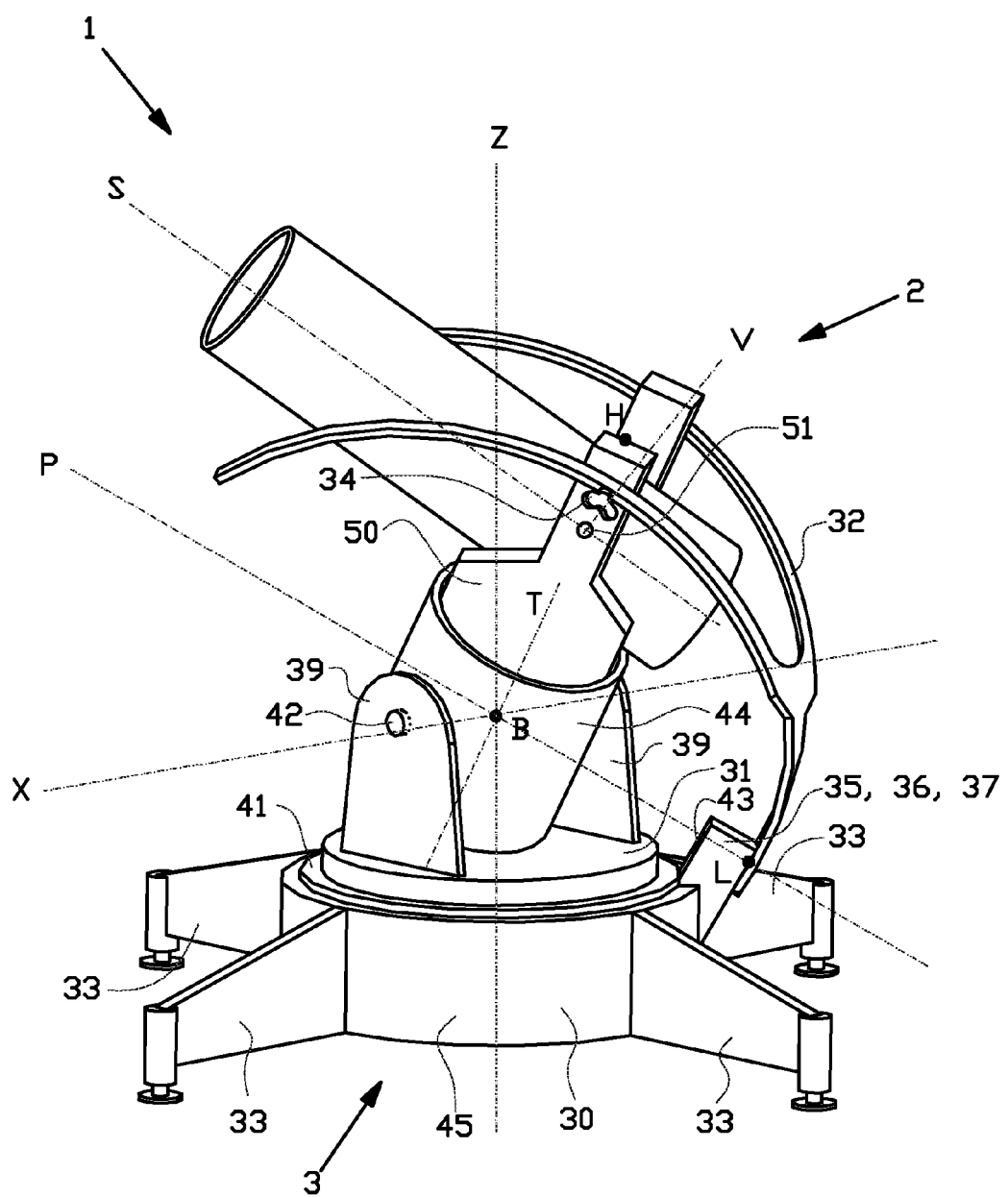
Figure 6:
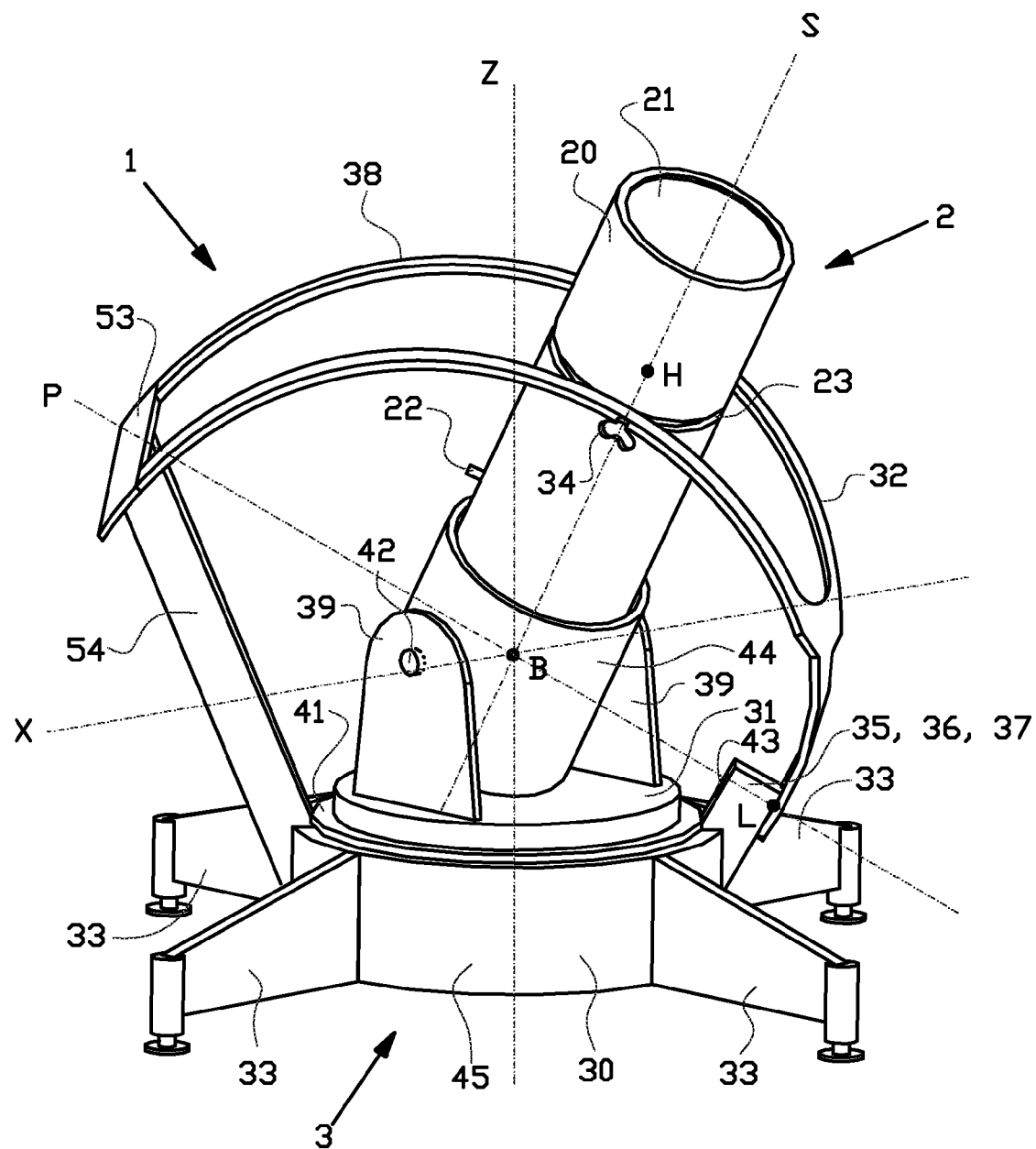
Figure 7:
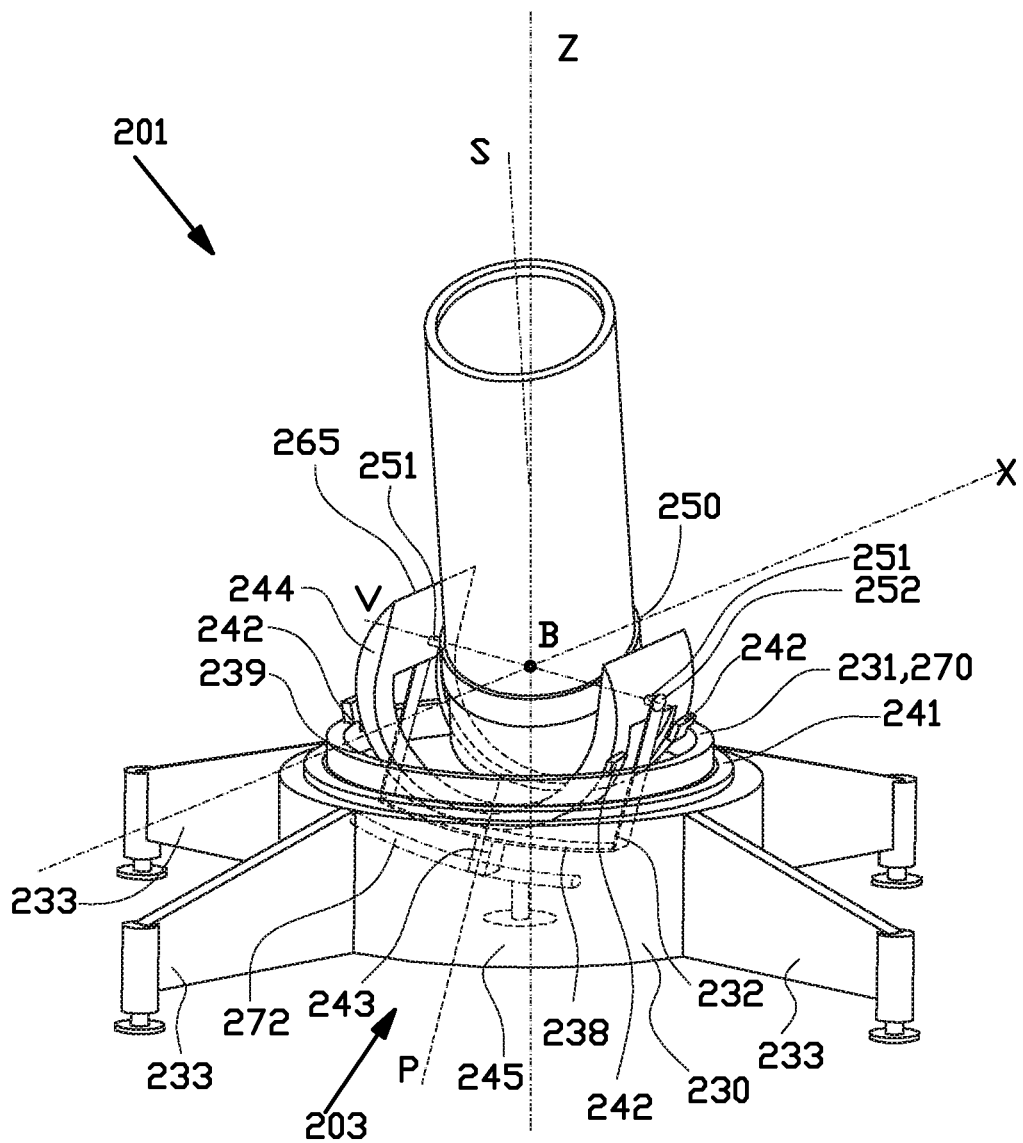

The invention will be elucidated on the basis of a number of exemplary embodiments shown in the attached schematic drawings, in which:

FIG. 1 shows a view of a telescope assembly according to the invention for tracking celestial bodies, FIG. 2 shows a schematic view of the telescope assembly according to FIG. 1 as positioned on the curved surface of planet earth, FIGS. 3A-D show a view of the operation of the telescope assembly according to FIG. 1 when tracking a celestial body, FIG. 4 shows a view of an alternative embodiment of a telescope assembly according to the invention, FIG. 5 shows a view of an alternative embodiment of the telescope assembly according to FIG. 4, FIG. 6 shows a view of a further alternative embodiment of the telescope assembly according to FIG. 1, and FIG. 7 shows a view of a further alternative embodiment of the telescope assembly according to the invention.

DETAILED DESCRIPTION OF THE DRAWINGS

FIG. 1 shows a telescope assembly 1 according to the invention for observing and tracking celestial bodies. The telescope assembly 1 comprises an astronomical, optical telescope 2 and a positioning device 3 which supports the telescope 2 and has it rotate about a number of axes of rotation.

The telescope 2 comprises an elongated, cylindrical housing 20 and a lens system 21 accommodated therein. Near the lower side of the housing 20 the telescope 2 is provided with an ocular lens 22 through which an astronomer is able to observe a field of view that is limited by the optical properties of the lens system 21. Near the upper side of the housing 20 the telescope 2 is provided with a circumferential attachment ridge 23 that is situated recessed with respect to the surface of the housing 20.

The positioning device 3 comprises an under frame 30, a first telescope holder 31 placed on the under frame 30 and a turntable or a rotary bearing 41 which couples the under frame 30 and the first telescope holder 31 to each other. The positioning device 3 is provided with a drive 45 arranged in the under frame 30 for in a rotary manner driving the first telescope holder 31 with respect to the under frame 30. The under frame 30 is placed on a level, substantially horizontal base by means of four adjustable legs 33 that are placed spaced apart from each other. In top view the telescope 2 itself is situated substantially within the contour that is spanned by the support locations of the adjustable legs 33. In that way an advantageous stability is achieved. Due to the advantageous stability said positioning device 3 is highly suitable to be used with medium-sized to large, and as a result heavy telescopes 2.

With respect to the base the rotary bearing 41 has a vertical axis of rotation Z, which is substantially perpendicular to the contact surface at the curved surface of planet earth at the location where the telescope assembly 1 is placed. The vertical axis of rotation Z passes through the symmetric centre of the under frame 30.

The first telescope holder 31 comprises two vertically upright supports 39. A rotary sleeve 44 is symmetrically arranged between the two supports 39 and coupled thereto by means of two hinges 42. By means of the hinges 42 the telescope 2 can be tilted about a horizontal axis of rotation X that passes through the two hinges 42 and with which the telescope 2 can be tilted at an angle of inclination to the base.

The lower side of the housing 20 of the telescope 2 is accommodated in the rotary sleeve 44 and within it is able to rotate with respect to the rotary sleeve 44 about its own longitudinal axis, optical axis or center line S. The housing 20 in this embodiment forms a second telescope holder, as described in the claims.

The positioning device 3 comprises a third arched telescope holder 32 which at the lower side is coupled to the under frame 30 by means of a hinge pin 43. The hinge pin 43 has a polar axis of rotation P which, at a distance from the attachment point L, extends through the intersection B. The freedom of movement of the third telescope holder 32 is limited to a swivelling motion about the polar axis P. At the upper side the third telescope holder 32 is provided with an elongated recess 38 for the accommodation of the upper side of the housing 20 of the telescope 2 at the level of the circumferential attachment ridge 23. The telescope 2 is fixedly connected to the third telescope holder 32 by means of wing bolts 34. The third telescope holder 32 extends beyond the first telescope holder 31, or free of it between the housing 20 and the under frame 30.

The dimensions of the various parts of the positioning device 3 are chosen such that the vertical axis of rotation Z, the horizontal axis of rotation X, the center line S and the polar axis of rotation P intersect in the same intersection B. The intersection B is situated in the center between the hinges 42 and is situated in the middle over the under frame 30. Due to the axes coming together in the intersection B and due to the symmetrical position of the intersection B the forces between and/or in parts as a result of the rotary movements are counteracted. By means of a counterweight that is not shown the assembly of the telescope 2 and the rotary sleeve 44 is in balance with itself about horizontal axis of rotation X, as a result of which hardly any forces are exerted on the third telescope holder 32.

The coupling between the third telescope holder 32 and the telescope 2 formed by the wing nuts 34 is situated at a distance from the intersection B, indicated by the distance between the intersection B and the concentric centre H of the circumferential attachment ridge 23. The coupling between the third telescope holder 32 and the under frame 30 formed by the hinge 43 is situated at a distance from the intersection B, indicated by the distance between the intersection B and the point of rotation L situated in the hinge pin 43.

The positioning device 3 comprises a measurement unit 35 for measuring the angle of rotation of the third telescope holder 32 about the polar axis of rotation P, a time clock 36 and a control unit 37 for controlling the drive 45.

FIG. 2 schematically shows that the base or the earth surface 9, which in general is experienced as substantially horizontal, due to the curvature of the earth surface 9 is tilted with respect to the surface spanned by the equator E, unless one is at the North or South Pole. The positioning of the telescope assembly 1 on the curved earth surface 9 at a distance from the North or South Pole, therefore results in the vertical axis of rotation Z being at a deviating angle to the parallactic axis of rotation P, which is parallel to the polar line or polar axis Q of planet earth, perpendicular to the surface spanned by the equator E of the earth. Due to said deviating angle and the fact that planet earth rotates about the polar axis Q, observing and in particular tracking celestial bodies from another location than the North or South Pole is subjected to a complex combination of the rotations. The proportion of the telescope assembly 1 in FIG. 2 in relation to the size of the earth is shown in a strongly exaggerated manner in order to be clear.

The field of view observed through the ocular lens rotates with respect to the celestial bodies observed, as a result of the rotation of planet earth as discussed above. This is also called field rotation. Field rotation, particularly in case of photography with a slow shutter speed, is undesirable, as it may lead to a blurred photo. Rotating the telescope 2 about the vertical axis of rotation Z and the horizontal axis of rotation X, counter to the rotation of planet earth, does not suffice to compensate the rotation of the earth, and as a consequence the field rotation.

Field rotation is compensated by the telescope assembly 1 according to the invention, as shown in FIG. 1, because the rotation of the third telescope holder 32 about the polar axis of rotation P is measured and compared with a regular signal of the time clock 36. The difference in rotation speed is processed in the control unit 37 into a control signal for the drive 45, such that the third telescope holder 32 rotates about the polar axis of rotation P with a constant or linear angular speed proportional in time. The telescope 2 that is rotation-fixedly coupled to the third telescope holder 32 rotates along about the center line S at the same linear angular speed. The joint rotations about the axes of rotation X, Z and S result in a slave rotation of the telescope 2 about the polar axis P.

FIGS. 3A-D show some moments in time of the joint rotations described above.

FIG. 3A shows the situation in the starting position, for instance at eight o'clock in the evening. The telescope 2 is rotated at an angle of inclination about the horizontal axis of rotation X and is subsequently rotation-fixedly connected in that position to the third telescope holder 32 by means of the wing bolts 34. The telescope 2 is pointed at a number of celestial bodies, which will be tracked during a time interval of for instance six hours.

FIG. 3B shows the situation in which the drive 45 has driven the first telescope holder 31 and has rotated it about the vertical axis of rotation Z for approximately one and a half hours. The rotary movement of the first telescope holder 31 is passed on to the telescope 2 via the tilting axis 42 and the rotary sleeve 44. The telescope 2 has rotated itself about the polar axis of rotation P within the rotational freedoms imposed by the third telescope holder 32 and the rotary sleeve 44.

In the time passed between the moments in time in FIGS. 3A and 3B the measurement unit 35 has measured the rotation speed of the third telescope holder 32 about the polar axis of rotation P. A full rotation of planet earth about the polar axis takes place in twenty-four hours, as a result of which the rotation about the polar axis of rotation P, which after all is parallel to the polar axis, can be brought into linear relation with the time passed. When the rotation about the polar axis of rotation P goes too fast with respect to the pulses of the time clock 36, the drive 45 is slowed down by the control unit 37. When the rotation about the polar axis of rotation P goes too slow with respect to the pulses of the time clock 36, the drive 45 is either accelerated by the control unit 37 or slowed down less. The rotations of the telescope about the vertical axis of rotation Z and the center line S thus are variable and depend on the linear rotation of the third telescope holder 32 about the polar axis of rotation P and are controlled in accordance with the measurement and control units 35, 37.

FIGS. 3C and 3D show moments in time of the continued rotation of the telescope 2 about the polar axis P. FIGS. 3A-D show the path C the outer end of the telescope 2 describes as a result of this rotary movement. To clarify the rotation about the center line S of the telescope 2 a reference line D is shown between the attachment points of the wing bolts 34.

FIG. 4 shows an alternative embodiment of the telescope assembly 1, wherein the third telescope holder 132 comprises a base part 137, a fork part 138 and a hinge 139 between the base part 137 and the fork part 138. The hinge 139 hinges about an axis of rotation W and connects the base part 137 and the fork part 138 to each other. The axis of rotation is transverse to the polar axis of rotation P, so that the movement of the third telescope holder 132 about the polar axis of rotation P, despite the presence of the hinge 139, is directly passed on to the telescope 2. The base part 137 is connected to the hinge pin 43. The fork part 138 comprises an elongated recess 140 for accommodating the upper side of the housing 20 of the telescope 2 at the level of the circumferential attachment ridge 23. The telescope 2 is fixedly connected to the third telescope holder 132 by means of wing nuts 134.

The hinge 139 offers the possibility to attach the telescope 2 at different angles of inclination to the third telescope holder 132. The two-part third telescope holder 132 takes up less space than the one-part arched third telescope holder 32 as shown in FIGS. 1-3D.

FIG. 5 shows an alternative embodiment of the telescope assembly according to FIG. 1. The telescope 2 has been replaced by a fourth telescope holder 50, which, just like telescope 2 in FIG. 4, at the lower side is accommodated in a rotary sleeve 44 and at the upper side is fixedly coupled to the third telescope holder 32. The fourth telescope holder 50 and the rotary sleeve 44 in this embodiment form the second telescope holder as described in the claims. The fourth telescope holder 50 has a center line T and is provided with hinges 51 which are spaced apart from the intersection B. The telescope 2, as shown in FIGS. 1-4, at the lower side is coupled to the fourth telescope holder 50 by means of the hinges 51. The hinges 51 provide a rotation about an axis of rotation V that is situated on the line between the intersection B and the point H between the wing nuts 34, perpendicular to the axis of rotation T. Prior to being used the telescope 2 can be tilted about the axis of rotation V in order to direct the field of view at the wanted celestial bodies. Subsequently the telescope 2 is rotation-fixedly connected to the fourth telescope holder 50 before being used.

Preferably the center line T of the fourth telescope holder 50 is tilted with respect to the polar axis P about the intersection B at an angle of ninety degrees. Such a perpendicular positioning of the fourth telescope holder 50 results in an optimal transfer of forces from the rotation of the first telescope holder 31 about the vertical axis of rotation Z to the rotations about the axes of rotation S and P.

In case of telescope assemblies as shown in FIGS. 1-4 the transfer of forces is such that in case of a telescope 2 that is directed vertically upwards the center line S of the telescope 2 coincides with the vertical axis of rotation Z, as a result of which the rotation about the vertical axis of rotation Z is converted less or no longer into a rotation about the polar axis P. This is a dead center or a dynamically undefined point in the rotary interaction. The rotation about the polar axis of rotation P as a result thereof comes to a standstill and the telescope 2 only rotates about its own center line S. As shown in FIG. 5, the fourth telescope holder 50, which instead of the telescope 2, is coupled to the second telescope holder 2, can be secured at another angle than the vertical, preferably as described above at an angle of ninety degrees to the polar axis of rotation P. As a result the center line T of the fourth telescope holder 50 is at another angle than the vertical axis of rotation Z, and it is counteracted that the fourth telescope holder 50 as a result of the dead center stops rotating about the polar axis. The telescope 2 coupled to the fourth telescope holder 50, also when it is directed vertically upwards, due to the rotation-fixed coupling remains moving in the hinge 51 about the polar axis of rotation P.

FIG. 6 shows a telescope assembly according to FIG. 1, wherein the arched third telescope holder 32 is also connected at the upper side with a hinge 53 situated on the polar axis of rotation P and which provides rotation about the polar axis of rotation P. The hinge 53 is connected to the under frame 3 by means of a beam 54. In that way a greater stability is achieved FIG. 7 shows an alternative telescope assembly 201 that is provided with an alternative positioning device 203 for the telescope 202. The alternative positioning device 203 comprises an under frame 230 with adjustable legs 233, a first telescope holder 231 placed on the under frame 230. The first telescope holder 231 is provided with a first, circular rotation ring 270. The rotation ring 270 of the first telescope holder 231 comprises a circumferential supporting edge 239 at the inwardly directed perimeter. The alternative positioning device 203 comprises a rotary bearing 241 having a vertical axis of rotation Z. The rotary bearing 241 bears the rotation ring 270 so as to be concentrically rotatable about the vertical axis of rotation Z on the under frame 230. The rotary bearing 241 bounds a passage to a central cavity in the under frame 230.

The alternative positioning device 203 comprises a second telescope holder 244 and several slide blocks 242 placed on the circumferential supporting edge 239 of the first telescope holder 231. The second telescope holder 244 comprises a cylindrical sleeve 265 having a C-shaped cross-section. The slide blocks 242 jointly define a circular slide having a horizontal axis of rotation X for the cylindrical outer side of the second telescope holder 244, for rotation thereof about the horizontal axis of rotation X with respect to the first telescope holder 231. The slide blocks 242 bear the second telescope holder 244 on the first telescope holder 231. The under frame 230, the first telescope holder 231 and the second telescope holder 244 as such form a series of parts placed on each other and which can be moved with respect to each other.

The telescope 202 is provided with a supporting ring 250 which concentrically bears the telescope 202. The supporting ring 250 is bearing mounted on both sides in the second telescope holder 244 by means of bearing axles 251, wherein the bearing axles 251 project on both sides of the second telescope holder 244.

The alternative positioning device 203 comprises a third telescope holder 232 which at the lower side is secured to the under frame 230 via a hinge 243 on a slide or a protractor 272 in the cavity of the under frame 230. The hinge 43 has a polar axis of rotation P that extends through the intersection B. The location of the hinge 243 along the protractor 272 is adjustable in order to be able to adjust the angle of the polar axis of rotation P with respect to the vertical axis of rotation Z, depending on the position of the telescope assembly 201 on planet earth. The protractor 272 has a curvature having a center in the intersection B, in order to achieve that the polar axis of rotation P of the hinge pin 243 always passes through the intersection B. At the upper side the third telescope holder 232 is provided with fork part 238. The fork part 238 extends out of the cavity in the under frame 230 through the passage in the rotation ring 270 of the first telescope holder 231 and free of the first telescope holder 231 in the direction of the second telescope holder 244. The fork part 238 is adapted for in between there accommodating the second telescope holder 244 and via an angle adjuster 252 that can be secured engages onto the protruding parts of the bearing axles 251.

During use of the telescope 202, the bearing axles 251 provide a rotation of the telescope 202 about an axis of rotation V that extends through the intersection B, perpendicular to the center line S of the telescope 202 and the horizontal axis of rotation X. Prior to being used the telescope 202 can also be tilted with respect to the fork part 238 about the axis of rotation V in order to direct the field of view on the wanted celestial bodies. For that purpose the angle adjusters 252 are temporarily loosened, the telescope 202 is tilted in the correct position and the angle adjusters 252 are secured again. In that way the telescope 202 is rotation-fixedly connected again with the third telescope holder 232. The position of the telescope 202 with respect to the third telescope holder 232 is thus fixed. The bearing axles 251 also transfer the movement of the third telescope holder 232 to the second telescope holder 244.

Of the series of the under frame 230, the first telescope holder 231 and the second telescope holder 244, the third telescope holder 232 only couples the under frame 230 and the second telescope holder 244 to each other, outside of the first telescope holder 231 that is placed in between in series. Consequently the movement of the third telescope holder 232 cannot be directly transferred to or imposed one-on-one on the first telescope holder 231. Just like in the embodiments described above the control unit 37 measures the rotation of the third telescope holder 232 with respect to the under frame 230 and the drive 45 drives the rotation of the first telescope holder 231.

The above description is included to illustrate the operation of preferred embodiments of the invention and not to limit the scope of the invention. Starting from the above explanation many variations that fall within the spirit and scope of the present invention will be evident to an expert.

The invention claimed is:

1. Telescope assembly for tracking celestial bodies, comprising a telescope and a positioning device for the telescope, wherein the positioning device is provided with an under frame to be placed on a base, a first telescope holder placed on the under frame which telescope holder in the placed condition of the under frame can be rotated about a vertical axis of rotation by means of a first rotary bearing, a second telescope holder which at a first side is coupled to the first telescope holder and which bears the telescope, wherein by means of a second rotary bearing the second telescope holder can be rotated with respect to the first telescope holder about a horizontal axis of rotation, wherein the vertical axis of rotation is perpendicular to the horizontal axis of rotation and intersects the horizontal axis of rotation in an intersection, wherein the telescope assembly is provided with a third telescope holder which, preferably at a distance from the intersection, is coupled to a second side of the second telescope holder, wherein the third telescope holder at a distance from the coupling between the second telescope holder and the third telescope holder is coupled to the under frame so as to be rotatable about a polar axis of rotation by means of a third rotary bearing, wherein the polar axis of rotation extends through the intersection of the horizontal and the vertical axis of rotation, wherein between the coupling with the second telescope holder and the third rotary bearing, the third telescope holder extends free of the first telescope holder.

2. Telescope assembly according to claim 1, wherein the third telescope holder is forked and at the location of the fork is coupled on both sides of the second telescope holder.

3. Telescope assembly according to claim 1, wherein the telescope assembly is provided with a fourth rotary bearing that rotatably couples the second telescope holder to the first telescope holder, wherein the fourth rotary bearing provides a rotation of the second telescope holder about its own center line or optical axis.

4. Telescope assembly according to claim 3, wherein the fourth rotary bearing is formed within a cylindrical sleeve in which the second telescope holder is concentrically accommodated.

5. Telescope assembly according to claim 3, wherein at the location of the fork the third telescope holder is rotation-fixedly connected to the second telescope holder.

6. Telescope assembly according to claim 1, wherein the first telescope holder is provided with two vertically upright supports in between which the second rotary bearing is arranged, wherein the second rotary bearing preferably comprises two hinges at the supports, which hinges are arranged on both sides of the first telescope holder and which are situated on the horizontal axis of rotation.

7. Telescope assembly according to claim 1, wherein the telescope assembly is provided with a drive for rotation of the first telescope holder with respect to the under frame about the vertical axis.

8. Telescope assembly according to claim 7, wherein the telescope assembly is provided with a control unit, which measures the rotation speed of the third telescope holder about the polar axis of rotation and compares it with a fixed or linear angular speed, wherein the control unit is adapted for adjusting the drive on the basis of the comparison in order to have the rotation of the third telescope holder about the polar axis take place in a linear manner.

9. Telescope assembly according to claim 8, wherein a full rotation of the third telescope holder about the polar axis takes one day.

10. Telescope assembly according to claim 1, wherein the telescope is accommodated in or forms a part of the second telescope holder.

11. Telescope assembly according to claim 1, wherein the telescope protrudes from the second telescope holder and is hinged to the second telescope holder.

12. Telescope assembly according to claim 11, wherein the telescope extends through the third telescope holder at a distance from the second telescope holder.

13. Telescope assembly according to claim 11, wherein the telescope is coupled to the third telescope holder at a distance from the second telescope holder.

14. Telescope assembly according to claim 1, wherein the third rotary bearing is detachably or movably connected to the under frame in order to be able to set the polar axis of rotation.

15. Telescope assembly according to claim 14, wherein the under frame is provided with a curved slide or a protractor, wherein the third rotary bearing can be secured at a position along the slide or protractor.

16. Telescope assembly according to claim 1, wherein the under frame has a cavity, wherein the first rotary bearing extends around a passage to the cavity in the under frame, wherein the third rotary bearing is situated in the cavity and the third telescope holder extends from the third rotary bearing out of the cavity through the passage towards the second telescope holder.

17. Method for tracking celestial bodies with a telescope assembly, comprising a telescope and a positioning device that bears the telescope, wherein the positioning device is provided with an under frame to be placed on a base, a first telescope holder placed on the under frame, which telescope holder in the placed condition of the under frame can be rotated about a vertical axis of rotation by means of a first rotary bearing, a second telescope holder which at a first side is coupled to the first telescope holder and which bears the telescope, wherein by means of a second rotary bearing the second telescope holder can be rotated with respect to the first telescope holder about a horizontal axis of rotation, wherein the vertical axis of rotation is perpendicular to the horizontal axis of rotation and intersects the horizontal axis of rotation in an intersection, wherein the telescope assembly is provided with a third telescope holder which, preferably at a distance from the intersection, is coupled to a second side of the second telescope holder, wherein the third telescope holder at a distance from the coupling between the second telescope holder and the third telescope holder is coupled to the under frame so as to be rotatable about a polar axis of rotation by means of a third rotary bearing, wherein the polar axis of rotation extends through the intersection of the horizontal and the vertical axis of rotation, wherein between the coupling with the second telescope holder and the third rotary bearing, the third telescope holder extends free of the first telescope holder, wherein the telescope assembly is provided with a drive for rotation of the first telescope holder about the vertical axis, wherein the method comprises the following steps: by means of the drive rotating the first telescope holder about the vertical axis, as a result of the rotation of the first telescope holder bringing the second telescope holder into motion, as a result of the motion of the second telescope holder having the third telescope holder rotate about the polar axis, measuring the rotation speed of the third telescope holder about the polar axis, comparing the rotation speed of the third telescope holder about the polar axis with a constant or fixed angular speed, on the basis of the comparison adjusting the drive so that the rotation speed of the third telescope holder about the polar axis takes place in a linear manner, as a result of the rotation of the third telescope holder having the second telescope holder rotate about its center line.

18. Method according to claim 17, wherein the telescope is accommodated in or forms a part of the second telescope holder.

19. Method according to claim 17, wherein the telescope protrudes from the second telescope holder and is hinged to the second telescope holder.

20. Third telescope holder, apparently suitable and intended for the telescope assembly according to claim 17.

\* \* \* \* \*